No. 659,068. Patented Oct. 2, 1900.
H. B. IVES.
ADJUSTABLE FASTENER FOR WINDOW BEADS.
(Application filed Dec. 22, 1897.)
(No Model.)

Witnesses
Frank P. Prindle
Henry C. Hazard

Inventor
Hobart B. Ives
by Prindle & Russell
his Attorneys

UNITED STATES PATENT OFFICE.

HOBART B. IVES, OF NEW HAVEN, CONNECTICUT.

ADJUSTABLE FASTENER FOR WINDOW-BEADS.

SPECIFICATION forming part of Letters Patent No. 659,068, dated October 2, 1900.

Application filed December 22, 1897. Serial No. 662,975. (No model.)

*To all whom it may concern:*

Be it known that I, HOBART B. IVES, of New Haven, in the county of New Haven, and in the State of Connecticut, have invented certain new and useful Improvements in Adjustable Fasteners for Window-Beads; and I do hereby declare that the following is a full, clear, and exact description thereof, reference being had to the accompanying drawings, in which—

Figure 1:
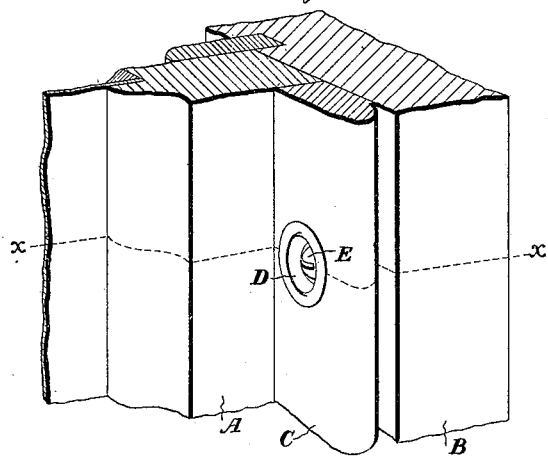
Figure 2:
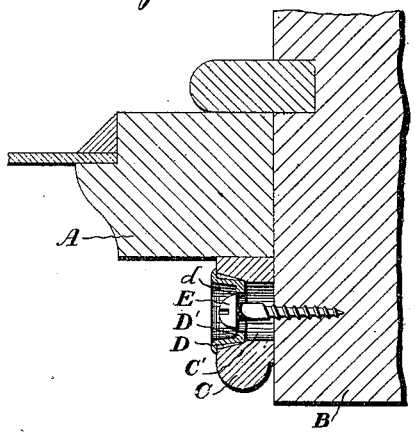
Figure 3:
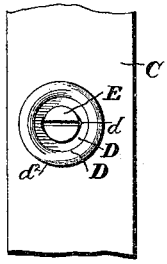
Figure 4:
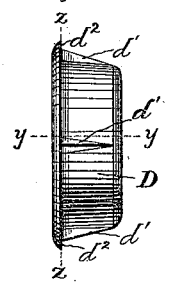
Figure 5:
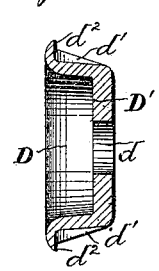
Figure 6:
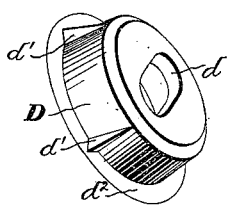
Figure 7:
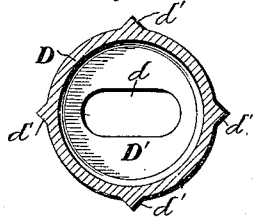

Figure 1 shows a perspective view of a portion of a sash-frame, window-casing, and window-bead with my adjustable fastener for the bead; Fig. 2, a view of a section on line $xx$ of Fig. 1; Fig. 3, a plan view of my fastener in place in a window-bead; Fig. 4, a view, on an enlarged scale, showing the bead-engaging part of my fastener in side elevation without its coacting screw; Fig. 5, a view of a section on line $yy$ of Fig. 4; Fig. 6, a view, on an enlarged scale, showing a perspective view of the bead-engaging part of my fastener; and Fig. 7, a view showing, on an enlarged scale, a section on line $zz$ of Fig. 4.

Letters of like name and kind refer to like parts in each of the figures.

The object of my invention is to provide an improved adjustable fastener for window-beads; and to this end my invention consists in the adjustable fastener and in the bead-engaging part thereof, as hereinafter specified, and pointed out in the claim.

My special object in making the present invention is to make an improvement in that class of window-bead fasteners in which there is a thimble or cup-shaped piece to be inserted in a hole in the bead, having a slotted table to be engaged by the head of a screw screwed into the casing or part to which the bead is to be adjustably secured. With this purpose in view I have devised the present fastener, with its bead-engaging part, as hereinafter explained, especially intended and adapted to always fit and be properly seated in the opening for it in the bead, notwithstanding such variations in the bead-holes as arise from variations in the action of different forms of boring-bits or in the nature of the wood of the bead, to be securely held against any rotation in the bead-hole in which it is seated, to offer no objectionable obstruction to the insertion or adjustment of window-screens between the opposite window-beads, to afford the greatest possible diameter of cavity and room for the screw-head without undue thinness or weakness of the walls of the fastener, and to have a strong thick slotted table for the engagement of the attaching-screw.

In the drawings, A designates a portion of a sash-bar, B a portion of a window frame or casing to which the window-bead is to be fastened, and C a portion of such bead.

C' designates the hole in the bead C, and D designates the bead-engaging part of my fastener seated in such hole and having its slotted table D' at its bottom, engaged by the head of the screw E, screwed into the frame or casing B, and having its shank passing through the slot $d$ in table D'. This slot extends in a direction transverse to the bead and is made longer than the diameter of the screw-shank, so that the part D and the bead can be moved some distance toward and from the sash-bar A independent of the screw-shank. The body of the part D, being cup-shaped, as shown, has its cavity above the table or bottom D' made of greater diameter than the head of screw E to allow for the sidewise in-and-out adjustment of the bead and part D with reference to the screw-shank just above referred to. The body of the part D is made tapering downward or inward toward the bottom or table end and has on its outer side the downwardly or longitudinally extending ribs $d'$ $d'$ and on its upper or outer edge an outwardly-extending flange or rib $d^2$ to rest against the outer face of the bead when the fastener-body is seated in the hole C' in the bead. This flange or lip is made quite thin and preferably has its under side made flat, so that it can be seated squarely against the bead and will not stand out away from the latter, so as to catch dust or interfere with the insertion or adjustment of a screen between the beads of a window to which my fastener may be applied.

The ribs $d'$ $d'$, of which there should be at least two, situated at or near the ends of a diametrical plane passing through the fastener-body at right angles to the slot $d$, are made tapering or diminishing in the amount of their projection beyond the outer side of the body of the fastener from their upper portion toward their lower ends. While for the best action in the even seating of the body in the hole in the sash-bead and the preventing of such body from rotation in such hole it is best that there should be at least two of the ribs $d'$ $d'$, it is possible, without departure from my invention, to have only one of such ribs, which by biting into the wood at the side of the hole in the sash-bead would prevent such objectionable rotation of the body of the fastener with reference to the sash-bead that might take place were the outer sides of such body made plain or unribbed. While two of these ribs situated as just above described can be used, I do not limit myself to such number, but contemplate using more of them, as desired. In the drawings four are shown, two being situated as above described and two more being placed beyond opposite ends of the slot $d$. Whatever the number of ribs used may be, they are preferably all made tapering or diminishing in height from their outer portion toward their inner ends in the manner hereinbefore described.

As shown in Figs. 2, 5, and 6, the slotted bottom or table $D'$ is made thicker than the side walls of the part D, so as to afford a good strong bearing for the head of the screw E, well adapted to stand the strain brought to bear upon such table when the screw is screwed in, so as to cause its head to bear upon the table strongly enough to hold the fastener and bead from outward or inward movement with reference to the sash-bar.

The side walls of the fastener can be made thinner, as there is no bending strain brought to bear upon them by the action of the fastening-screw. I make them, as shown, quite thin, so as to secure the greatest possible room for side play of the part D and window-bead with reference to the screw E.

The ribs $d'$ $d'$, which I make integral with the body of the fastener and of solid portions of the metal formed on the outside of the body without any corresponding grooves or offsets on the inside of the latter, serve as stiffeners to strengthen the walls of the body against inward pressure as the fastener is driven home in the hole prepared for it in the window-bead. Being made in one piece with the body D and with the lip or flange $d^2$, it is clear that the ribs $d'$ $d'$, forming rigid connections between the sides of the body and the lip beyond such sides and well out toward its outer edge, are admirably adapted to stiffen and hold the lip or flange against any bending strain such as it is subjected to by its engagement with the outer face of the head when the body D is drawn inward in its receiving-hole in the head and when the screw is screwed into the hole the head from sidewise movement by the engagement of the screw-head with the outer or upper face of the slotted table D.
With these ribs so connected with or formed in one piece with the body the lip or flange $d^2$ can be made quite thin, so as to project but very slightly above the surface of the head without any danger of its bending or giving under any strain brought to bear upon it, as the strain of the screw upon the table $D'$ tends to draw the body D inward in the head-hole. With the ribs $d'$ $d'$, secured to the flange or lip, made tapering downward or inward therefrom and V-shaped in cross-section they are adapted to afford the greatest possible strengthening of the flange, while affording the least amount of resistance to the seating of the body D in the hole in the head, with its flange or lip $d^2$ resting flatly against the face of the bead around the edge of the hole therein. The diameter of the hole as bored does not have to be increased because of these ribs, for the latter as the part D is seated in the bead-hole, being narrow and preferably sharp, find room for themselves in grooves which they make in the sides of the hole however hard the wood of the bead may be. The ribs so seated in the wood around the hole in the bead will then effectually prevent any chance of rotation of the part D in said hole as the screw E is turned in one way or the other to release part D or secure it and the bead at any desired point of their adjustment with relation to the sash window frame or casing and sash-bar.

With both the body or part D of the fastener and the ribs on the outer side of the latter made tapering from the outer toward the inner end of part D it has been found that my improved fasteners can readily be properly and securely seated in the window-beads even when there is considerable variation in such holes, such as may be caused by the use of different forms of boring-tools or of the same tool in different woods. In spite of such variations in the receiving-holes the part D of my fastener can always be readily seated, so that the lip or flange $d^2$ will be flat against the bead, and the ribs $d'$ $d'$ will so engage the wood around the hole as to effectually prevent any rotation of the part D to take its slot $d$ out of a line transverse to the bead.

In making the part D of my fastener, as above described, and shown in the drawings, I prefer to draw it from one piece of metal, first stamping a cup from a disk of metal by a suitable stamp and die. This cup I then draw by suitable dies, so as to leave the thick table or bottom $D'$, and make the sides thinner by forcing up the metal to form the lip or flange $d^2$, at the same time forming the ribs $d'$ $d'$. The surplus metal is then cut off from the edges of the lip or flange, and the slot $d$ is cut in the table or bottom $D'$ by any suitable die or tool.

Having thus described my invention, what I claim is—

As an article of manufacture, a device for use in adjustable fasteners for window-beads, having a thick slotted table, thin sides and a lip or flange, said sides being drawn up from the metal adjacent to the table to form with the table a cup-shaped body with the lip or flange on its upper edge, such table being left substantially the normal thickness of the metal, and said lip being formed of the metal displaced in thinning the sides, such bottom, sides and lip being integral with each other, substantially as and for the purpose described.

In testimony that I claim the foregoing I have hereunto set my hand this 3d day of December, 1897.

HOBART B. IVES.

Witnesses:
LOUIS A. BABCOCK,
FRED S. CLARK.